United States Patent Office 3,466,353
Patented Sept. 9, 1969

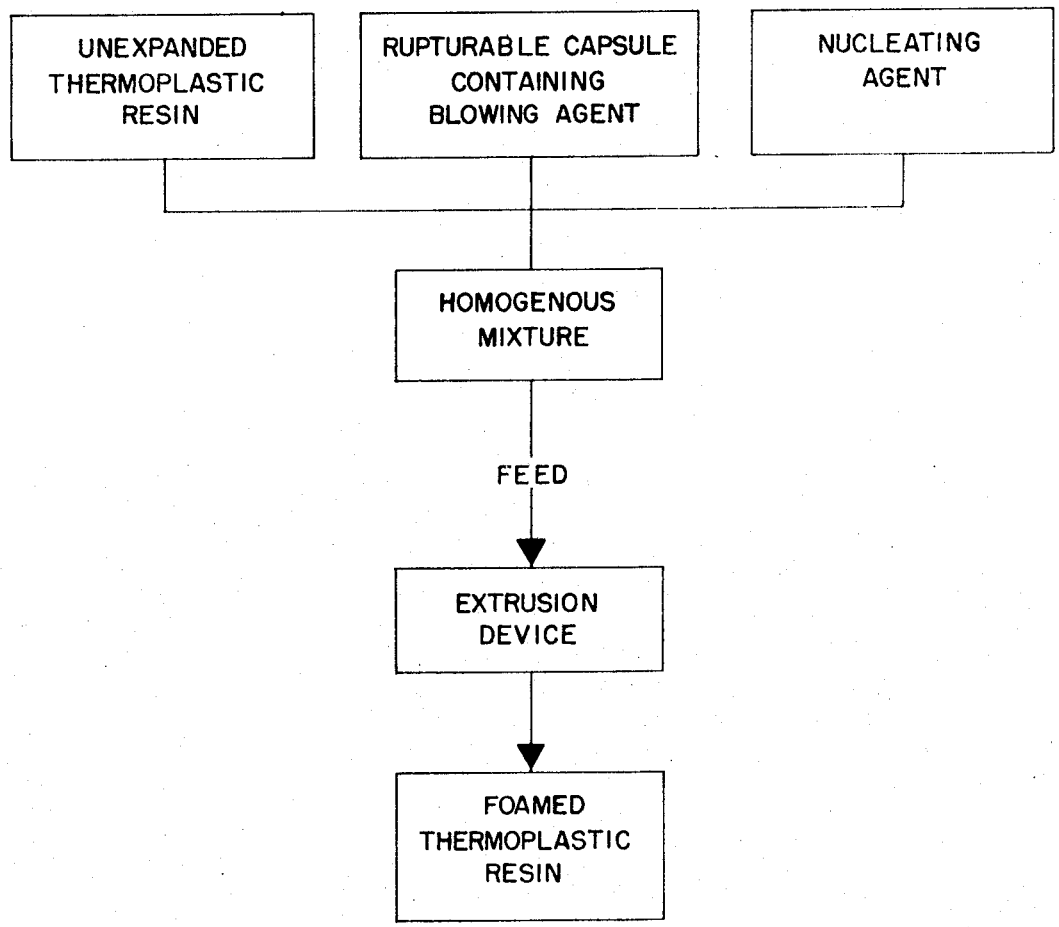

3,466,353
FOAMED RESIN EXTRUSION PROCESS EMPLOYING MICROENCAPSULATED BLOWING AGENTS
Howard M. Turner, Oak Forest, Ill., assignor to Continental Can Company, Inc., New York, N.Y., a corporation of New York
Filed Nov. 29, 1966, Ser. No. 597,528
Int. Cl. B29d 27/00; B29h 7/20
U.S. Cl. 264—53               7 Claims

ABSTRACT OF THE DISCLOSURE

Foamed thermoplastic polymers such as polystyrene are produced by extruding the thermoplastic resin mixed with rupturable capsules having a suitable blowing agent encapsulated within.

BACKGROUND OF INVENTION

Field of invention

This invention relates to a process for making foamed thermoplastic resins and more particularly to a thermoplastic foam made directly by extrusion on conventional extrusion machines.

The prior art

Foams of thermoplastic polymers such as polystyrene constitute an important class of materials which are finding increasingly wide application in the fabrication of numerous industrial and consumer products such as beverage containers, insulated storage chests, shipping materials, novelties, etc. It is known to the art to prepare cellular articles from thermoplastic resins such as polystyrene in the form of beads having a propellant or agent for expanding or blowing incorporated therein. Beads of this kind are known in the art and are commercially available. Upon application of heat, the impregnated beads will expand to many times their original volume to produce cellular articles.

While incorporating a blowing agent in the thermoplastic resin has been widely adopted, such a procedure presents certain difficulties, particularly with sensitive blowing agents, or blowing agents which can be activated at relatively low temperature. Further, careful control must be exercised in order to incorporate such blowing agents in the resin.

SUMMARY OF THE INVENTION

The present invention overcomes the difficulties of the prior art by a process wherein an unexpanded thermoplastic resin is first mixed with a nucleating agent and discreate capsules having a blowing agent encapsulated within an outer rupturable shell and the mixture added to an extruder and extruded at an elevated temperature.

BRIEF DESCRIPTION OF THE DRAWING

The drawing is a flow sheet illustrating the method of the present invention.

PREFERRED EMBODIMENTS OF THE INVENTION

Any thermoplastic material which can be expanded or foamed as a result of or by application of heat thereto may advantageously be fabricated according to the method of the present invention. Examples of resins that may be employed include: thermoplastic resins such as homopolymers and copolymers of vinyl chloride, homopolymers of vinyl aromatic hydrocarbon compounds and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, vinyl naphthalene, alpha-methylstyrene, and copolymers of such vinylidene aromatic hydrocarbon compounds with other vinylidene monomers in which the copolymer contains at least 70% of the vinylidene aromatic hydrocarbon compound, polymers and copolymers of methyl methacrylate, such as its homopolymers and the copolymers thereof with vinylidene chloride; various thermoplastic, expandable natural and synthetic rubber compositions; thermoplastic expandable ester and other derivatives of cellulose including cellulose acetate, cellulose propionate, cellulose acetate, cellulose butyrate, ethyl cellulose, cellulose nitrate, and the like; homopolymers and copolymers of monomeric compounds containing the $CH_2=C<$ grouping such as olefins, e.g., ethylene, propylene, copolymers of ethylene and propylene, isobutylene, chlorinated polyolefins such as chlorinated polyethylene; vinyl halides, e.g., vinyl chloride; vinylidene chloride; vinyl esters of carboxylic acids, e.g., vinyl acetate, vinyl butyrate, vinyl stearate, vinyl benzoate; vinyl ethers, e.g., vinyl methyl ether, vinyl ethyl ether, vinyl isobutyl ether, unsaturated carboxylic acids and derivatives thereof, e.g., acrylic acid, methacrylic acid, methyl acrylate, ethyl acrylate, methyl methacrylate, acrylamide, acrylonitrile, and interpolymers of the above mentioned vinylidene monomers with unsaturated alpha, beta-unsaturated polycarboxylic acid and derivatives thereof, e.g., maleic anhydride, diethyl maleate, dibutyl fumarate, diallyl maleate, dipropyl maleate, etc. It is feasible and sometimes desirable to employ a blend of two or more thermoplastic resins such as a blend of styrene and a rubbery polymer, e.g., natural rubber, butadiene-acrylonitrile rubbers, and the like. High impact polystyrene prepared by polymerizing monomeric styrene in the presence of a rubbery diene polymer also may be employed advantageously.

The rupturable capsules containing the blowing agent may be prepared in any conventional manner. A convenient method and encapsulating apparatus for forming the capsules useful in the process of the present invention are disclosed and described in U.S. Patent No. 3,015,128. Briefly, the encapsulating apparatus comprises a rotatable nozzle having a chamber therein and an encapsulating insert removably mounted in the chamber, the encapsulating insert having an encapsulating orifice formed in its outer wall. A solution of a film-forming polymeric material is delivered to the encapsulating orifice for forming successive films thereacross through various passageways formed in the nozzle, including an annular outwardly converging slot defined by corresponding spaced-apart conical surfaces formed on telescoping parts of the encapsulating insert. The blowing agent to be encapsulated is delivered to the inner surface of a polymeric film through a conduit disposed centrally of the annular slot. Means is provided for rotating the nozzle at such speeds as may be required to provide sufficient centifugal force to cause the polymeric film to wrap around and encapsulate the blowing agent contained therein and to sever the centrifugally formed wet capsules from the rotating nozzle and sling them into a hardening bath or other treating medium. After hardening, the capsule is subjected to drying to evaporate and remove any residual polymer solvent remaining in the capsule shell.

The outer rupturable shell of the capsules used in the process of the present invention is preferably produced from a film forming material which is organic in nature and capable of providing inneractive forces such as are capable of producing a network in the form of a continuous dry film or shell. The film-forming material must be substantially inert to the blowing agent employed and when the shell is produced, the outer shell must not permit excessive permeation of the blowing agent.

The capsule shell remains intact and retains the blowing agent within. Under the temperatures and pressures developed during the extrusion of the thermoplastic resin, the shell will break and release the blowing agent which is then caused to intimately be admixed with the thermoplastic resin with which it comes in contact, causing the foaming of the polymer as it emerges from the extruder.

Suitable organic film-forming materials from which the capsule shell may be formed include cellulose derivatives such as cellulose acetate, cellulose acetate butyrate, thermoplastic synthetic resins such as polyvinyl resins, that is, polyvinyl alcohol (water or organic solvent soluble) polyvinyl chloride, copolymers of vinyl chloride vinyl acetate, polyvinyl butyral, polystyrene, acrylic resins such as polymethacrylate, polyallyl, polyethylene and polyamide (nylon) resins. Natural film-forming materials also included within the scope of the present invention include proteins such as gelatin, zein protein, alginates, caseins and derivatives thereof.

The optimum size of the capsules will depend somewhat on their use. For many purposes, the capsules may have an average diameter of 500 to about 2,500 microns, and preferably about 800 to about 1,000 microns. Larger sizes of up to about 1/8 inch diameter may be employed. Frequently, their diameter is about 15 to about 25 times the thickness of the plastic skin surrounding their hollow interior but these dimensions will be dependent upon the concentration of the film-forming material and the blowing agent contained therewithin.

The blowing agent generally comprises about 60% to 75% of the total weight of the capsule. The blowing agent which is encapsulated within the capsule of the present invention may be any organic compound which is inert to the outer walls of the capsule, boils below the softening point of the thermoplastic polymer, and which can be incorporated substantially homogeneously therethrough during extrusion.

Suitable blowing agents include aliphatic hydrocarbons boiling in the range of approximately 20° to 100° C. such as hydrocarbons having 4 to 8 carbon atoms such as butane, pentane, hexane, heptane, octane, and mixtures thereof with volatile solvents.

The capsules containing the blowing agent are included in the extrusion mixture in amounts ranging from about 0.1% to about 10% by weight based on the weight of the polystyrene resin. Particularly good results are obtained in the range of about 0.6% to about 6% by weight of the capsule.

Nucleating agents which may be used in the process of the present invention include the alkali and alkaline earth metal bicarbonates, carbonates, citrates, oxalates, formates and benzoates such as sodium bicarbonate, ammonium carbonate, ammonium bicarbonate, calcium oxalate, magnesium oxalate, ammonium oxalate, sodium formate, ammonium benzoate, sodium sulphite, trisodium phosphate, sodium ammonium acid phosphate, calcium lactate and mixtures thereof.

The nucleating agent is added to the extrusion mixtures at a concentration of about 0.5 to about 1.0% based on the weight of the thermoplastic resin.

It will be realized that the temperature at which the extrusion mixture of polystyrene resin, blowing agent, capsules, and nucleating agent are extruded into a foam is dependent upon such variables as the rate of extrusion and the nature of particular polymer being extruded. For polystyrene, it has been found that in general, extrusion temperatures in the range of from about 300° to about 400° F. are satisfactory.

To illustrate the manner in which the present invention may be carried out, the following examples are given. It is to be understood, however, that the examples are for the purpose of illustration, and the invention is not to be regarded as limited to any of the specific materials or conditions recited therein.

Example 1

An intimate mixture was prepared of 55 parts by weight impact grade polystyrene beads (Dylene polystyrene 401 manufactured by Sinclair-Koppers Company), 44 parts by weight crystal polystyrene beads (ASTM D703–56T Type 4), 1 part by weight of a rupturable capsule having hexane encapsulated therein, and 0.4% by weight sodium bicarbonate and 0.3% by weight citric acid (based on the weight of the total polystyrene resin in the charge).

The capsules included in this mixture were prepared using the apparatus and method described in U.S. Patent 3,015,128. The film-forming material of which the rupturable outer shell of the capsule was formed consisted of an aqueous solution containing dissolved therein 4.5% by weight algin, 2.0% by weight polyvinyl alcohol, and 1.0% by weight gelatin. The capsules had a diameter size range of 850 to 1,400 microns and the hexane comprised 60% of the bulk weight of the capsule.

The mixture of citric acid, sodium bicarbonate, polystyrene resins, and the hexane containing capsules was then added to the hopper of a conventional plastics entruder having a length-to-diameter ratio of 24:1 fitted with a sheet die, and extruded at a temperature in the range of 300° to 350° F. The extruded foamed sheet was then passed to a chill roll maintained at 25° to 30° C.

The resulting formed sheet was essentially white and was found to have a density of about 30 pounds per cubic foot. The cell size was small and uniformly distributed.

Example 2

The procedure of the example was repeated using capsules having a hexane-blowing agent encapsulated therein, the capsule shells being prepared from a film-forming aqueous solution of 4.0% algin, 3.0% sodium casineate, and 1.0% gelatin.

The foamed white sheet had a relatively glossy surface and a density of approximately 30 lbs./ft.$^3$.

What is claimed is:

1. The method of producing foamed thermoplastic resins extruded in one operation comprising forming a homogenous admixture of the unexpanded resin particles with discrete rupturable capsules comprising a blowing agent encapsulated within an outer rupturable shell of a film-forming material and a nucleating agent and simultaneously foaming and extruding said admixture in an extruder at an elevated temperature.

2. The method of claim 1 wherein the thermoplastic polymer is polystyrene.

3. The method of claim 1 wherein the outer rupturable shell of the capsule is formed from an organic water-soluble polymeric material.

4. The method of claim 1 wherein the outer rupturable shell is formed from an aqueous solution having polyvinyl alcohol dissolved therein.

5. The method of claim 1 wherein the outer rupturable shell is formed from an aqueous solution having algin dissolved therein.

6. The method of claim 1 wherein the outer rupturable shell is formed from an aqueous solution having caseinate dissolved therein.

7. The method of claim 1 wherein the blowing agent encapsulated within the capsule is an aliphatic hydrocarbon boiling in the range of about 35° to about 120° C.

References Cited

UNITED STATES PATENTS

| 2,766,478 | 10/1956 | Raley et al. | 264—4 |
| 3,015,128 | 1/1962 | Somerville | 18—2.6 |
| 3,069,367 | 12/1962 | Beaulieu et al. | |
| 3,299,914 | 1/1967 | Harmon | 229—1.5 XR |
| 3,359,130 | 12/1967 | Goldman | 264—53 XR |
| 3,379,799 | 4/1968 | Goldman | 264—53 XR |

FOREIGN PATENTS 854,586  11/1960  Great Britain.

OTHER REFERENCES

Hansen, R. H.: "Novel Methods for the Production of Foamed Polymers: 1. Nucleation of Dissolved Gas by Localized Hot Spots," Society of Plastics Engineers, Inc. 20th Annual Technical Conference, Technical Papers, vol. X, Atlantic City, N.J., Jan. 27–30, 1964, pp. 1–4, title page.

PHILIP E. ANDERSON, Primary Examiner

U.S. Cl. X.R.

260—2.5; 264—4, 54, 176